United States Patent
McEwen et al.

(10) Patent No.: US 7,440,208 B1
(45) Date of Patent: Oct. 21, 2008

(54) FLEXIBLE PARTIAL RESPONSE TARGETS FOR DATA DETECTORS

(75) Inventors: Peter McEwen, deceased, late of Porter TX (US); by John McEwen, legal representative, Porter, TX (US); Bahjat Zafer, Sunnyvale, CA (US); Pauline Bolte, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 673 days.

(21) Appl. No.: 10/251,362

(22) Filed: Sep. 20, 2002

Related U.S. Application Data

(60) Provisional application No. 60/323,956, filed on Sep. 21, 2001, provisional application No. 60/323,960, filed on Sep. 21, 2001.

(51) Int. Cl.
  G11B 5/09 (2006.01)
  G11B 20/10 (2006.01)
  G11B 27/36 (2006.01)
  G11B 5/035 (2006.01)

(52) U.S. Cl. .................. 360/39; 360/31; 360/65
(58) Field of Classification Search ............ None
  See application file for complete search history.

(56) References Cited

U.S. PATENT DOCUMENTS

| | | | | |
|---|---|---|---|---|
| 5,552,942 | A | * 9/1996 | Ziperovich et al. | 360/51 |
| 5,661,760 | A | * 8/1997 | Patapoutian et al. | 375/341 |
| 5,862,005 | A | 1/1999 | Leis et al. | 360/27 |
| 5,999,355 | A | * 12/1999 | Behrens et al. | 360/65 |
| 6,144,515 | A | * 11/2000 | Nishida et al. | 360/66 |
| 6,201,839 | B1 | 3/2001 | Kavcic et al. | 375/341 |
| 6,249,398 | B1 | 6/2001 | Fisher et al. | 360/65 |
| 6,307,696 | B1 | 10/2001 | Bishop et al. | 360/51 |
| 2002/0060869 | A1* | 5/2002 | Sawaguchi et al. | 360/46 |

OTHER PUBLICATIONS

Zeng et al.; "Modified Viterbi Algorithm for Jitter-Dominant $1-D^2$ Channel;" IEEE Trans. On Magnetics; vol. 28; No. 5; Sep. 1992; pp. 2895-2897.

* cited by examiner

*Primary Examiner*—Joseph Feild
(74) *Attorney, Agent, or Firm*—Cesari and McKenna, LLP

(57) ABSTRACT

Automatically optimizing and programming features of a disk drive read channel for a selected partial response (PR) target. This enables flexible PR targets to be used in the read channel. The flexible PR targets can have arbitrary coefficients, and the channel features (parameters, functions and algorithms) that are dependent on the flexible PR targets are automatically adapted and programmed in hardware or firmware. With flexible PR targets, the read channel can support longitudinal and perpendicular recording without compromising performance.

78 Claims, 8 Drawing Sheets

FLEXIBLE PARTIAL RESPONSE TARGETS FOR DATA DETECTORS

RELATED APPLICATION

Applicant claims priority from U.S. Provisional Application No. 60/323,956, entitled "An Automatically Optimized Flexible Partial Response Target Implementation", filed on Sep. 21, 2001, which is incorporated herein by reference. Applicant further claims priority from U.S. Provisional Application No. 60/323,960, entitled "A Media Noise Optimized Detector for Magnetic Recording", filed on Sep. 21, 2001, which is incorporated herein by reference.

FIELD OF THE INVENTION

The present invention is in the field of digital data storage technology and, more specifically, pertains to improvements in partial response, maximum likelihood detection systems of the type commonly used in read channels of magnetic recording systems, particularly disk drives and tape systems.

BACKGROUND OF THE INVENTION

Disk drives are well known in the computer art for providing secondary mass storage with random access. A disk drive essentially comprises one or more magnetic data storage disks rotating on a spindle by a spindle motor, within an enclosed housing. A magnetic transducer head is placed on an actuator arm and positioned very closely to each data storage surface by a slider suspended upon an air bearing. Servo information are typically written in servo sectors which interrupt data sectors or blocks on each disk. Servo information provide a servo control loop in the disk drive with head position information to enable a head positioner mechanism, such as a rotary voice coil motor, to move the actuator, and therefore the head, from track to track during random access track seeking operations, and to maintain the head in proper alignment with a track centerline during track following operations when user data is written to or read from the available data block storage areas of the disk surface.

There have been efforts to increase the data storage capacity of disk drives. In one example, the bit density on the disk magnetic medium is increased to pack the data more tightly on a given track. When this method is implemented, writing data is still relatively simple using standard inductive head technology. Reading the data back, however, becomes more challenging as spacing between flux transitions on the medium is reduced. To ensure accurate data reads, several methods are used. It is known to use two separate heads; one for reading and one for writing. Standard inductive heads are used for writing, and ultra-sensitive magneto-resistive (MR) heads are used for reading. The read heads generate analog signals in response to flux transitions on the medium, and the "read signal" is interpreted or "detected" by the drive electronics (e.g., detector).

Sampled data detectors implementing partial response (PR) signaling are in use in conventional disk drives. In sampled data detection systems, the readback signal is filtered and sampled at a channel rate of 1/T, wherein T is the duration of a channel symbol. One such technique employs what is known as a partial response maximum likelihood (PRML) system. The synchronous sampling process employed in PRML quantizes signal amplitudes at specific intervals throughout each readback signal transition interval T. One widespread PRML system uses filters to equalize the readback signal to a partial response class 4 (PR4) signal. The discrete-time transfer function of a PR4 channel is $(1-D)^2$, where D represents a unit-time delay operator with unit-time T. In an idealized PR4 channel, a noiseless output is equal to the input signal minus a version of the input signal delayed in time by 2T. In a practical PR4 channel, the output of the noisy partial response channel is sampled at the channel rate and detected using a sequence detector, such as a Viterbi detector. Typically, the Viterbi detector is designed for maximum-likelihood detection of the sampled partial response channel in additive, independent, and identically distributed Gaussian noise with zero mean. Another partial response model is EPR4 with a discrete-time transfer function of $(1-D)(1+D)^2$ or $(1+D-D^2-D^3)$ and EEPR4 with a discrete-time transfer function of $(1-D)(1+D)^3$ or $(1+2D-2D^3-D^4)$. Other partial response models are also known, such as new partial response (NPR) having a unit pulse response of e.g. $7+4D-4D^2-5D^3-2D^4$.

Once a channel model is selected, a sequence detector may be fashioned. Sequence detectors frequently implement a version of the Viterbi algorithm. A Viterbi detector implementing the Viterbi algorithm minimizes squared Euclidean distance between the sequence of noisy samples and all possible sequences of idealized noiseless samples in accordance with the particular channel model. The Viterbi algorithm is an iterative process of keeping track of the path (branch) with the smallest accumulated metric (branch metric BM) leading to each state. The metrics of all of the paths leading into a particular state are calculated and compared. Then, the path with the smallest metric is selected as a survivor path and the other paths are discarded. In this manner all paths which are not part of the minimum metric path are systematically eliminated. The survivor path to each state is stored in a path memory. Given that the path memory is made sufficiently long, all of the selected survivor paths will diverge from a single path within the span of the path memory. The single path from which all the current survivor paths diverge is the minimum metric path. The Viterbi detector then traces back along the path memory to find the convergence state. The input sequence associated with the single minimum metric path then becomes the most-likely symbol output of the Viterbi detector.

A Viterbi detector does not attempt to decide whether a transition has occurred upon receipt of a readback sample or samples taken from a particular transition. Rather, samples are taken from the readback signal and equalized to the target channel model. The Viterbi detector then keeps a running tally of the error between the actual sample sequence and a correct sample sequence, i.e. a sequence that would be expected if the recording medium had been written with a particular sequence of transitions. One way of visualizing the Viterbi detector path memory is by way of a trellis diagram having plural states and plural paths leading from each state to other states. As analog-to-digital samples (s) are fed into one end of the trellis, estimates of previous bits are put out at an opposite end of the trellis. An error metric is determined for each one of plural possible state transition sequences. As more samples come into the Viterbi detector, less probable transition sequences (branches/paths) are eliminated, and by tracing back along the trellis a most likely path emerges as a convergent set of paths and enables a most-likely data decision to be made by the Viterbi detector.

In its current implementation, PRML presents limitations. It is generally known that for any given magnetic recording product, variations exist in the actual head/media response on a per head/disk basis as a function of many parameters, including manufacturing tolerances on the head and disk components, fly height of the magnetic head, component aging, environmental conditions, radius of the particular track, etc. This variation manifests itself mainly in pulse width and signal-to-noise-ratio variations.

Because of the variations, the optimum partial response target varies over the range of heads and disks, head aging, etc. The proper (e.g., optimal) partial response target would be one that adapts as a function of channel variation to jointly improve said minimum-distance between all allowable sequences of idealized channel outputs (ICO's), while also minimizing the noise and equalization error for said Viterbi detector error events (known as "sigma"). Further, conventional algorithms do not provide for automatically optimizing over different types of Viterbi detector error events There are many parameters and algorithms in a read channel utilizing a Viterbi-type detector that are a function of the PR target coefficients. In order for the read channel to work reliably, these parameters and algorithms should be adjusted properly based on the PR target coefficients selected. Previous approaches provide only one or a small number of fixed (i.e., hardcoded) PR targets.

BRIEF SUMMARY OF THE INVENTION

The present invention addresses the above shortcomings. The present invention provides a method of automatically optimizing and programming the read channel parameters and algorithms for any PR target that is selected. It enables flexible partial response targets to be used in a read channel. The partial response target can have arbitrary coefficients, and the relevant channel parameters and algorithms that are dependent on the target are automatically adjusted and programmed in hardware and/or firmware.

Having flexible PR targets provides a performance benefit in longitudinal recording, because the selection of the PR target can be adapted (e.g., optimized) for each head/media combination (surface) or each radial zone. For perpendicular recording, flexible PR targets provide a large performance benefit as the proper (e.g. optimal) PR targets for perpendicular recording are very different from those for longitudinal recording. In one example, with flexible PR targets, longitudinal and perpendicular recording can be supported in the same read channel without compromising performance. Another benefit of flexible PR targets is that as heads and media evolve for both perpendicular and longitudinal recording, the PR targets can easily be changed to maintain or improve performance.

Further, the present invention allows selecting from among multiple PR targets, based on various criteria such as e.g. location of data on the disk (e.g., disk inner diameter or outer diameter), head/media combinations, bit error rate (BER), recording format (e.g., perpendicular recording), etc. Other criteria can also be used for selection of the PR target for the channel to improve performance such as signal-to-noise-ratio in reading data from the disk. Therefore, the present invention allows the channel to be implemented such that the target can be flexible, allowing selection of different targets as desired for improved performance. The present invention further provides methods for determination of corresponding channel parameters and functions that depend on the selected targets. As such, there is no need to hard code the channel for particular targets and corresponding channel parameters and functions. Such channel parameters and functions can be determined in real-time (e.g., during disk drive self-scan or user operation) upon selection of desired PR targets.

BRIEF DESCRIPTION OF THE DRAWINGS

These and other features, aspects and advantages of the present invention will become understood with reference to the following description, appended claims and accompanying figures where:

Like reference numbers refer to like elements.

DETAILED DESCRIPTION OF THE INVENTION

Figure 1:
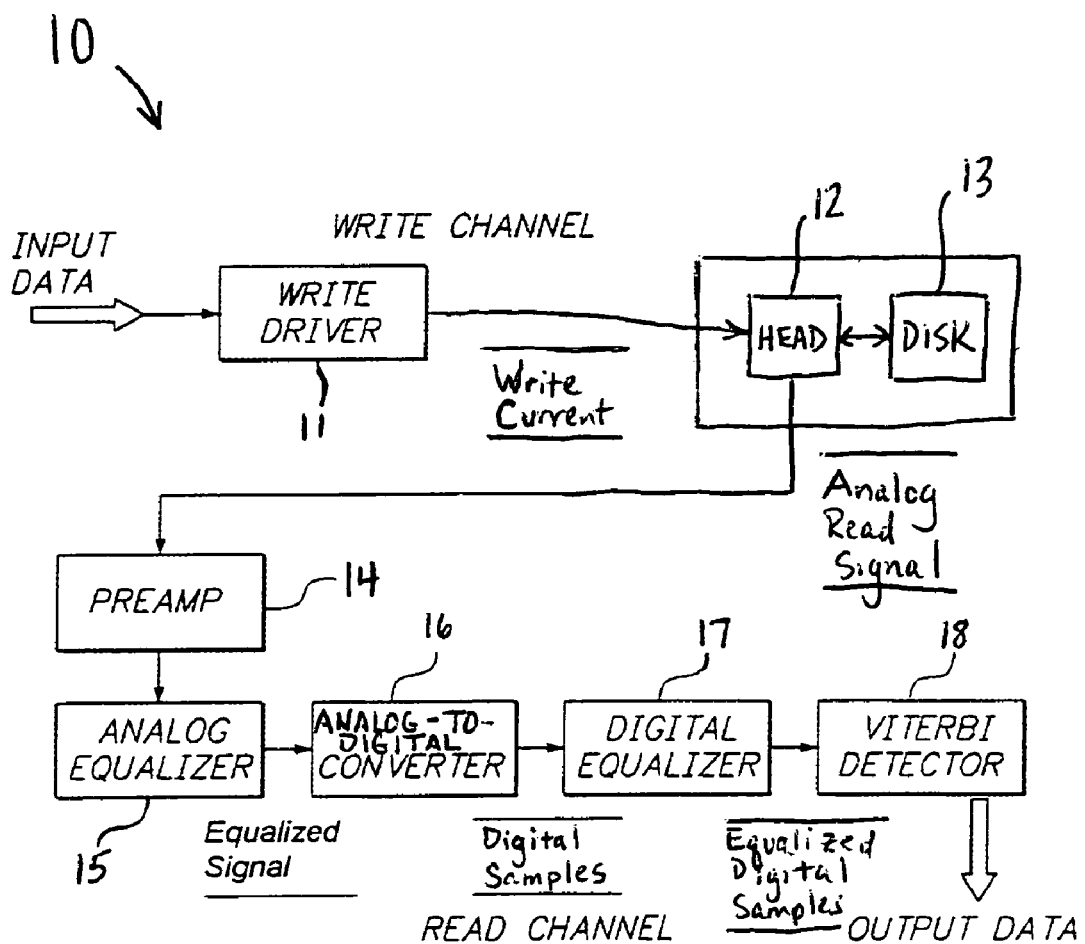
FIG. 1 is a simplified example diagram of an embodiment of read channel electronics in a data disk drive.

FIG. 1 is a simplified block diagram illustrating the principal building blocks of a magnetic recording and read channel of the type used in a PRML disk drives, such as described in commonly assigned U.S. Pat. No. 6,249,398. In the write channel, user data is encoded using a run length limited (RLL) code, such as RLL (1,7) or RLL (0,4/4), the latter providing a ratio of user data to stored data of about 8/9. The encoded series of bits are input to write driver circuitry 9 which controls current applied to a write head carried on a slider over the rotating magnetic disk medium 12 The write driver in combination with the write head records the data as a series of magnetic flux transitions on a selected track on the medium. For example, a "1" is represented as a transition and a "0" as no transition.

While reading data, the read head provides an analog signal responsive to the flux transitions as the data track moves past the head. The analog read signal 14 is input to a preamp 16 and then to analog equalizer circuitry 18. The equalizer 18 provides a preliminary analog equalization of the read signal. The equalized read signal is then sampled and the samples are converted to digital values (s) in a high-speed A/D converter (ADC) 20. In general, the read channel amplifies and filters the read signal to remove noise and to shape the waveform—a process known as equalization. First, the read signal is normalized with respect to gain and offset so that it falls into an expected signal range centered at zero. With gain and offset normalization, the required dynamic range of subsequent circuits can be limited, which reduces power consumption and increases possible clock frequencies and data rates. Next, unwanted high-frequency noise is removed with a continuous time low-pass filter. This step permits sampling of the signal without aliening of high-frequency noise back into the signal spectrum.

The analog equalizer block 18 comprises a variable gain amplifier (VGA), low-pass filter, and an adaptive equalizer implemented as a FIR filter. The goal is to have the output of the FIR filter match the target response, for example a three-level PR4 signal. The adaptive equalization can be implemented in various ways which are known to those skilled in the art. In the FIR filter, the signal values at the output of each tap are multiplied by a calculated value (a tap weight) and summed to generate the FIR output in analog circuitry. However, tap weight control processing is implemented with digital circuitry. A DSP computation unit updates the FIR filter's tap weights using the standard least means square algorithm ("LMS"). LMS operates in the time domain to define tap weight coefficients that reduce the means-squared error between the sample values and the desired response. The equalized signal is converted to digital samples, as noted, and further equalized in a digital equalizer 22 and finally applied to the Viterbi detector 24.

Figure 2:
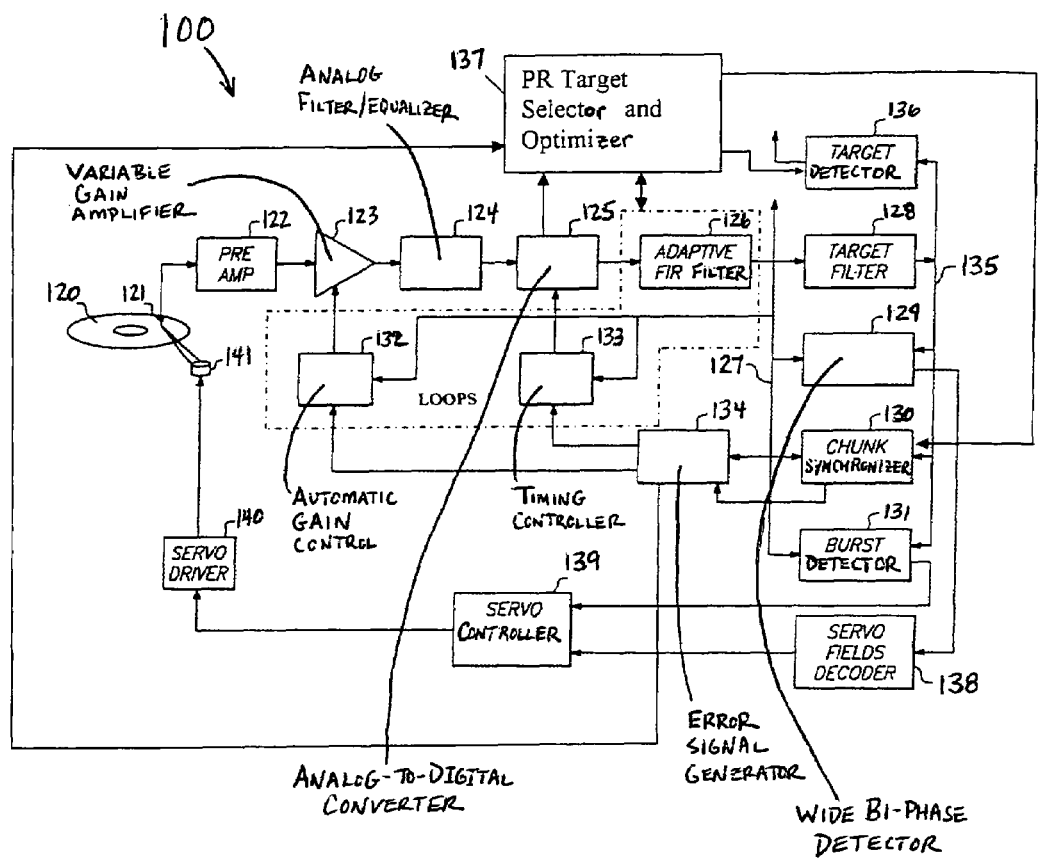
FIG. 2 is a simplified block diagram of an embodiment of read channel electronics in a data disk drive according to the present invention.

The present invention provides a method of automatically optimizing and programming the read channel parameters and algorithms, for any PR target that is selected. It enables many different partial response targets to be used in a read channel. The partial response target can have arbitrary coefficients, and the parameters and algorithms that are dependent on the target are automatically adapted (e.g., optimized) and programmed in hardware and/or firmware. FIG. 2 shows a block diagram of an embodiment of a disk drive 10 incorporating a read channel and a PR target selection and optimization block 13, according to the present invention. The disk drive 10 further includes at least one data storage disk 11, and a data transducer head 26 (e.g., a magneto-resistive head) that is associated in a "flying" relationship over a storage surface of each disk 11. The head 26 is positioned relative to selected ones of a multiplicity of concentric data storage tracks defined on each storage surface of the rotating disk 11.

Embedded servo patterns are written in a conventional servo writing process during drive manufacturing on selected data storage surfaces of the disk 11. During reading, flux transitions sensed by head 26, as it flies in close proximity to the selected data track, are preamplified by a read preamplifier circuit 28. The preamplified analog signal (or "read signal") is then sent into an analog variable gain amplifier (VGA) 38. After controlled amplification, the read signal is then passed through a programmable analog filter/equalizer stage 40.

As described in more detail further below, the analog filter/equalizer 40 is programmed so that it is adapted for the data transfer rate of the selected data zone from within which the transducer head 26 is reading data. The equalized analog read signal is then subjected to sampling and quantization within a high speed analog to digital (A/D) converter 46 which, when synchronized to user data, generates raw data samples {x(k)} of selected bits of resolution.

An adaptive digital FIR filter 48 employs adaptive filter coefficients for filtering and conditioning the raw data samples {x(k)} in accordance with the desired channel response characteristics in order to produce filtered and conditioned samples $\{s_k\}$. The bandpass filtered and conditioned data samples from FIR filter 48 are then passed over a data bus path 49 to a target detector 61, which detects user data with the PR target. The filtered and conditioned samples from FIR filter 48 may also be passed through a target (e.g. 1+D) filter 50, the output path 51 of which provides the signal filtered to channel response characteristics.

The samples, including raw data samples and filtered samples, are taken at the data sampling rate, which has a clock bit time period T. The time T corresponds to a "bit cell" or, more simply, a "cell", at the sampling rate. A timing loop 53 may receive the PR target samples on path 49 and synchronize sampling and quantization by the analog to digital (A/D) converter 46 at desired sampling locations. Similarly, a gain loop 54 may control the VGA 38 based e.g. on error values produced by an error measurement circuit 58 connected to receive the PR target samples on path 49. A DC offset control loop may also be provided to adjust for DC offset based on the PR target samples. An MRAC loop may also be included to control MR asymmetry.

The disk drive 10 can also include a wide bi-phase detector 52 for detecting wide bi-phase encoded servo information symbols, in accordance with framing patterns generated by a chunk synchronizer 56. The detector 52 and synchronizer 56 may receive servo symbol sample values on the path 49, or the path 51. The circuit also includes a synchronous burst detector 55 which likewise receives sample values either from path 49 or path 51. A servo fields decoder 63 receives, frames and decodes servo symbols from servo fields decoded by the wide bi-phase detector 52. Position error signals (PES) from the burst detector 55 and servo field information from the decoder 63 enter a servo control process circuit 65 wherein actuator current command values are generated. These values are applied to a head position servo driver circuit 67 and resultant driving currents are supplied to drive a voice coil motor (VCM) 69 which positions the head 26.

Each servo region on disk tracks includes information used by the head position servo for precisely positioning and tracking the head over the particular track, as described in commonly assigned U.S. Pat. No. 6,307,696. Each servo region also includes a "preamble pattern," typically a repeating pattern of plus and minus magnetic flux transitions that will be reproduced as a sine wave analog signal in the read channel for the purpose of synchronizing a servo demodulator phase locked loop (PLL) to the servo position data stored on the recording surface. Interspaced with the servo wedges are data sectors where the digital data is stored on the magnetic media. Each data sector likewise includes a preamble sine wave pattern that is used for synchronizing the read channel PLL to data being read off the magnetic disk.

At the beginning of a disk read operation or, more precisely, in preparation for each data read operation or servo operation, the read channel timing loop circuitry is re-synchronized to the current preamble pattern. In one example described in U.S. Pat. No. 6,307,696, this timing acquisition is aided by a Zero-Phase Restart (ZPR) circuit, according to which a voltage-controlled oscillator (VCO) is held for a short time, and then released so as to be aligned with the incoming analog read signals A digital PLL accurately (and quickly) estimates the initial input signal phase, and then initializes the VCO phase to that of the input signal before the PLL commences normal operation. This step function or "jump start" to an accurately estimated phase value enables the PLL to settle and lock very quickly. An all-digital circuit for improved timing acquisition can be used, wherein an interpolating digital timing loop is leveraged to create an all-digital ZPR circuit that can initialize the correct sampling phase with very high accuracy. The ZPR function preferably is used in conjunction with a two-stage PLL loop filter to improve timing acquisition performance, although it is useful in a PLL with a first order loop filter as well. The circuit takes advantage of a PLL with a digital integrator and phase interpolator in place of the conventional analog VCO.

The ZPR circuit calculates the initial phase of the input signal, based on an arctan lookup table, although equivalent implementations could be used (RAM, logic, etc.). The arctan lookup is based on a ratio of accumulated sine and cosine components of the input preamble signal. The sampling clock phase is then shifted by the calculated phase error, and then two-stage timing acquisition proceeds. Since the calculation is based on a ratio of accumulated values, gain variations cancel one another out of the calculation, as do analog component variations.

Referring back to FIG. 2, the target detector 61 can implement the Viterbi algorithm for detecting user data with the PR target. As mentioned, the Viterbi algorithm essentially provides an iterative method of determining the maximally likelihood route along the branches of a trellis. The Viterbi detector receives a series of samples, and the detector's task is to take the stream of quantized, sampled values and in effect "decide" which sequence of values is the most likely to have been received. The power of Viterbi detection—and PRML in general—is that it works with sequences of received data rather than single bits (as in pulse peak), comparing these sequences of "data" (not user data but filtered read signal samples) with the few known possible sequences to determine which sequence is most likely to have been the actual data. A simple analogy is that of handwriting recognition. Systems that attempt to recognize individual characters often fail, as every individual's writing style is highly variable. Systems that recognize entire words, however, have a much higher success rate: when analyzing the word hello, for example, even if the program cannot decode the letter h, checking the rest of the word hello against an internal dictionary shows that the unrecognizable character should be an "h".

Referring back to FIG. 2, the PR target selection and optimization block 13 allows the read channel parameters and algorithms to be automatically adapted and programmed for different PR targets that are selected. In one example, an output of the error block 58 to the block 13 provides PR target selection criteria (e.g., bit error rate, mean square error, etc.). Other criteria can be used by the block 13 to select PR targets. An output of the block 13 is connected to the chunk sync block 56 and the target detector 61, for providing optimization values thereto. The selection of the PR target also affects the FIR filter 48 as a function of the PR target (FIG. 8 described further below provides a more detailed example).

Having flexible PR targets provides a performance benefit in longitudinal recording, because the selection of the PR target can be adapted (e.g., optimized) for each head/disk combination (surface) or each radial zone of the disk. For perpendicular recording, flexible PR targets provide a large performance benefit because the proper (e.g., optimal) PR targets for perpendicular recording are very different from those for longitudinal recording. With flexible PR targets, longitudinal and perpendicular recording can be supported in the same read channel without compromising performance. Another example benefit of flexible PR targets is that, as heads and media evolve for both perpendicular and longitudinal recording, the PR targets can easily be changed to maintain or improve performance.

In prior approaches to partial response read channels, only one or two specific (fixed) targets are utilized, and corresponding channel parameters and functions are hard coded for each target (requiring more chip space and power). By contrast, the present invention allows use of many PR targets (i.e., flexible targets as opposed to conventional one or two fixed targets) for the channel, and provides methods for generalizing the optimization and implementation of various channel parameters and functions based on each selected PR target, without the need for hard coding for each selected PR target (e.g., reducing chip space, cost, power consumption, etc.). The chip hardware and/or firmware calculates and optimize the channel parameters and functions for a selected target in real-time.

This allows selection from among multiple PR targets, based on various criteria such as e.g. location of data on the disk (e.g., disk inner diameter or outer diameter), head/media combinations, bit error rate (BER), recording format (e.g., perpendicular recording), etc. Other criteria can also be used for the selection of the PR target for improving channel performance such as signal-to-noise-ratio in reading data from the disk. Therefore, the present invention allows the channel to be implemented such that the target can be flexible, allowing selection of different targets as desired for improved performance. The present invention further provides methods for determination of corresponding channel parameters and functions that depend on the selected targets As such, there is no need to hard code the channel for particular targets and corresponding channel parameters and functions. Upon selection of desired PR targets, such channel parameters and functions can be determined (e.g., optimally) in real-time, such as during disk drive selfscan or operation.

In FIG. 2, the detector 61, such as a Viterbi detector, includes a path memory. The present invention will be described as an example of a read/write channel for a disk drive which includes a generic $2^h$ state sequence detector with a latency or path length of L bits. An example conventional read/write channel has a sequence detector where h equals 4 and L equals 12. A latency of L bits means that normally the maximum length of the competing paths through the trellis before they merge is L bits (L bit clock cycles). A trellis diagram is obtained by adding a time axis to a sequence detector state diagram.

Figure 3:
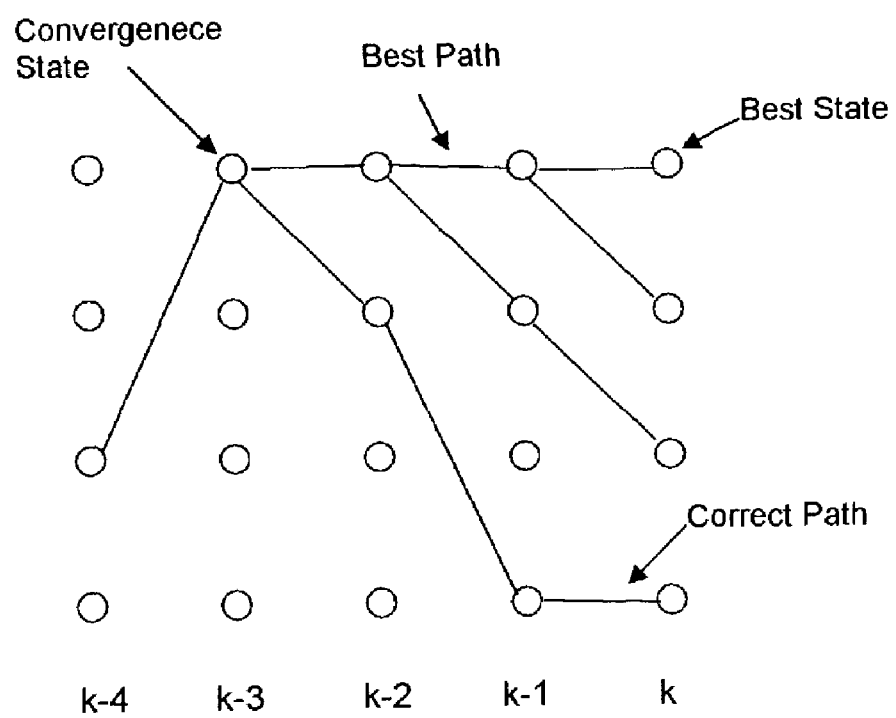
FIG. 3 illustrates a path memory as a two-dimensional trellis for a partial response Viterbi detector.

FIG. 3 illustrates a path memory as a two-dimensional trellis for a partial response polynomial of length $h(D)=1+mD+nD^2$, or h equals 2 and L equals length 12, for example. In the FIG. 3 example each horizontal row of the trellis represents a particular state vector. For example, the top row has a state vector of 11, the next row a state vector of 10, the third row a state vector of 01 and the lowest row a state vector of 00. The paths through the trellis represent all possible sample sequences. The rightmost column of states represents states and paths from the most recently entered data samples. The leftmost column of states represents the oldest or least recent paths.

In the FIG. 3 example, there are four states and four trellis depths or paths (j) between states established by five bit clock intervals, from right (newest) to left (oldest), k, k−1, k−2, k−3 and k−4. At every depth or level of the trellis, a trace back is made from each state by determining a path metric. In one preferred form the path metric is the sum of mean squared error on the particular path. The path metric identifies a best state and a best path, as labeled in FIG. 3. There are multiple paths extending along the FIG. 3 trellis. During each clock cycle, the FIG. 3 Viterbi detector updates the four state metrics and selects one of the paths as a survivor path for each of the four states. The survivor path represents the path having the minimum path metric leading to a particular state, and the state metric represents the metric associated with that path. In order to update the state metrics, the detector extends the survivor paths to obtain two paths to each state in the next trellis depth. Each path metric is obtained by adding a state metric to a branch metric, where the branch metric represents the squared Euclidean distance between the current noisy sample and the noiseless sample associated with the branch. In the FIG. 3 example with four states, during each bit clock cycle, eight path metrics are calculated and four comparisons are carried out in order to select the survivor paths. Each state transition, i.e. each new read signal sample, results in an output—the ideal value (i.e., ideal channel output or d's)—described by the target polynomial (e.g., NPR or $7+4\times D-4\times D^2-5\times D^3-2\times D^4$).

Figure 4:
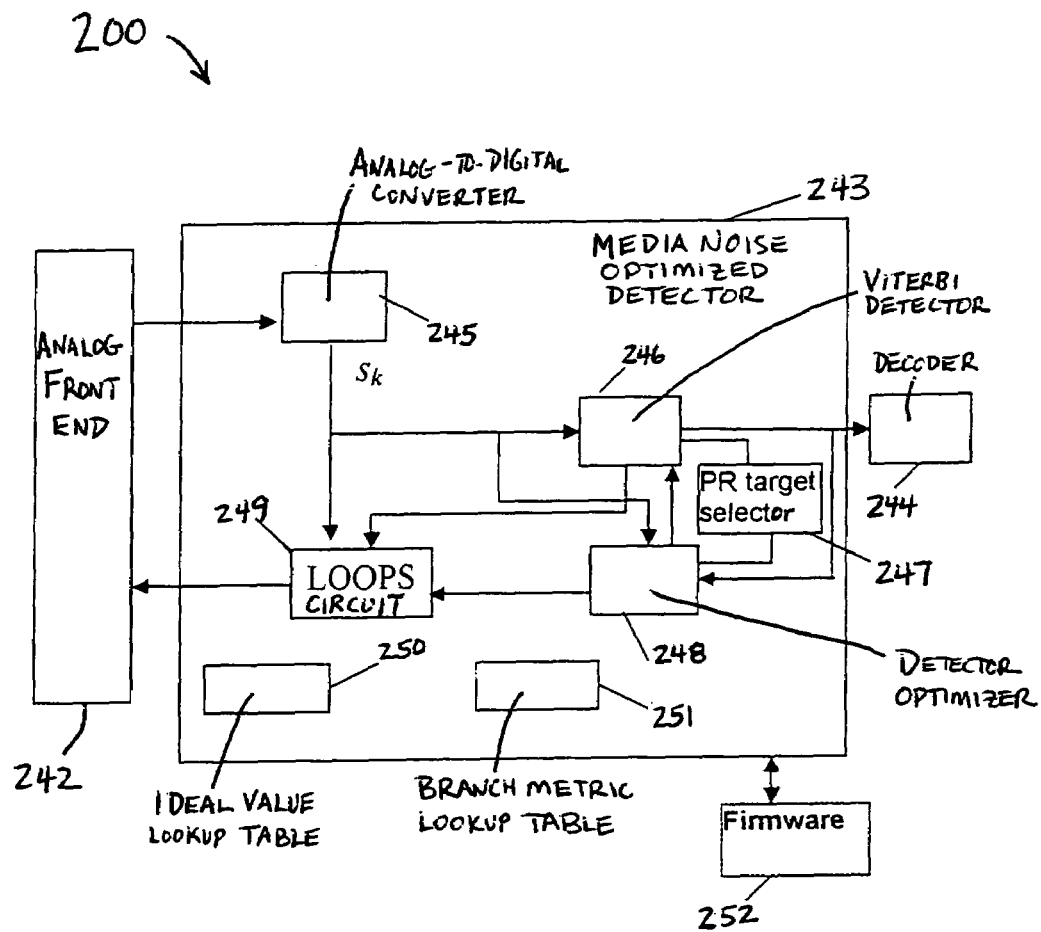
FIG. 4 shows an example block diagram of a channel for a data storage device according to an aspect of the present invention.

FIG. 4 shows an example block diagram of a read path implementation including aspects of the present invention. An example channel 100 comprises an analog front end (AFE) 102 that provides the analog readback signal, and a media noise optimized detector (MNO) 103 including an analog to digital converter (ADC) 104, a detector such as a Viterbi detector (VTB) 106, a LOOPS block 108 and a detector optimization block (DO) 110. The MNO 103 shows an example implementation of the PR target selection and optimization block 13 of FIG. 2. The channel 100 further includes a decoder (DEC) 112 within the read path. Because in the example write process the data is encoded using modulation codes (RLL codes) such as e.g. (1,7) code, (0,4/4) code or 50/51 code rate, (0,14) and so on, in the read process the data is decoded using the DEC 112 to obtain the data in its original format before encoding. The DEC 112 utilizes the output of VTB 106 as the binary data to be decoded. In one example, the MNO 103 can be implemented in a logic circuit or as ASIC configured to perform the method of present invention. In another example, the method of the present invention is implemented as firmware and/or software for execution by a processor in the DO block 110 on the MNO 103, or other processor in the disk drive.

The binary output of the VTB 106 is provided to the DO block 110, and the DO block 110 uses the ADC 104 samples and the VTB 106 output, to generate ideal values d's (and scaling factor values f's). Ideally, if noiseless, the input to the VTB 106 can be reconstructed from the VTB 106 output. However, the actual ADC 104 input to the VTB 106 is not perfect (i.e., ADC input=ideal signal+noise). As such, the ideal ADC values are reconstructed using the VTB 106, and subtracted from the actual ADC values to determine the noise Using the DO block 110, the d's are then calculated. Further, the DO block 110 determines the aforementioned channel parameters and functions based on selected PR targets by a PR target selector 107.

The LOOPS block 108 includes a timing loop, an automatic gain control loop (AGC), MR nonlinearity asymmetry cancellation (MRAC) block, equalization loop, etc. (not shown), to ensure adaptation to the correct values. The LOOPS block 108 uses the outputs of the VTB 106 and the DO block 110, to utilize the d's in the calculation of the signal(s) that drive said loops. The connections between the LOOPS block 108 and the DO block 110 are for using the d's in the LOOPS block 108.

In another example, said media noise optimized detector MNO 103, is implemented by adjusting the conventional Viterbi detector branch metric using the parameters calculated by the DO block 110 so that said ideal values can be linear and/or non-linear functions of the state/branch bits (further said branch metric scaling factors are a function of the state/branch—i.e., function of the data). The MNO detector 103 can be retrained to detect and compensate for various data readback signal variations due to different causes, including e.g. thermal decay, external DC magnetic field effects on perpendicular recording, etc., and provide sequence amplitude margin capability.

For a given trellis state/branch, the ideal value can be the mean of the ADC samples for the pattern corresponding to the state/branch, and the branch metric scaling factor is proportional to the noise variance for the pattern corresponding to that state/branch. This improves probability of obtaining good read data, and provides an accurate branch metric.

In the example described herein, the ADC output samples are denoted as s, the ideal values denoted as $d_j$ and the branch metric scaling factors as $f_j$, wherein j is the branch number (i.e., the length of the partial response target specifies j, such that for a partial target of the form $p_0+p_1 \times D + \ldots + p_{n-1} \times D^{n-1}$, then j=1 ... $2^n$, wherein n–1 is the order of the partial response target and n is the number of coefficients). The ideal value $d_j$ can have both linear and nonlinear components, which is a more accurate representation of read signal nonlinearities. An example branch metric BM for the jth branch suggested by U.S. Pat. No. 6,201,839, Kavcic, et al., is essentially:

$$BM=(s-d)^2/f_j$$

Figure 5:
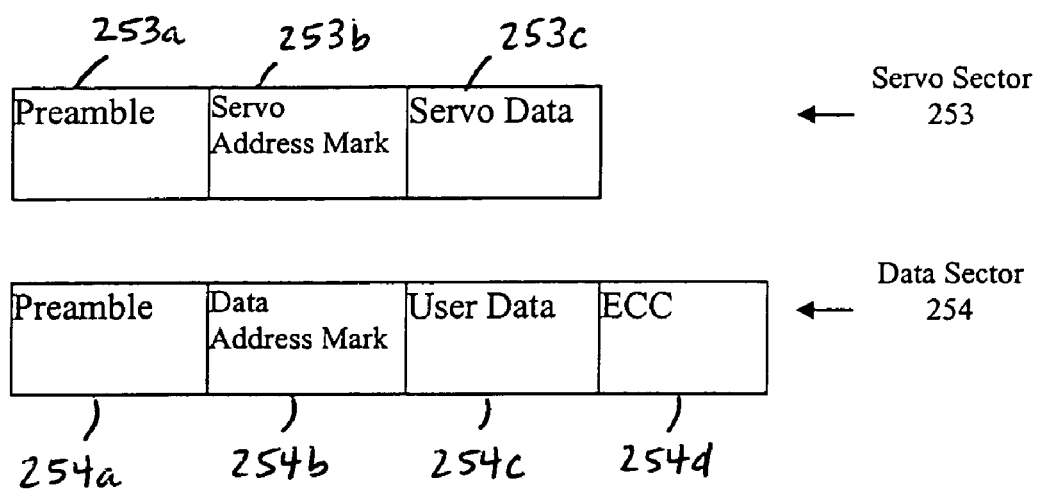
FIG. 5 shows example disk data sectors.

As mentioned above, several parameters and algorithms in the read channel 100 are a function of the PR target coefficients. According to the present invention, in order for the read channel 100 to work reliably, these parameters and algorithms are adapted by the MNO block 103 based on the PR target coefficients. A method is provided herein for automatically optimizing and programming the read channel parameters and algorithms for any PR target that is selected by the PR target selector 107. In one case, the parameters and algorithms/functions can be adapted in hardware or firmware (e.g., implemented in the DO block 110) for a selected PR target, for reading disk servo data and user data sectors, shown by example in FIG. 5. Each data sector 120 includes a preamble 120a, an address mark 120b, user data 120c and error correction codes (ECC) 120d. Each servo sector 122 includes a preamble 122a, address mark 122b and servo data 122c.

Said channel parameters and functions include, for example: Zero-phase start (ZPS), Chunk sync (CS), Detection of start of address mark (STAM), Error generation, Slope lookup table (SLT), Data timing gradient, Preamble timing gradient, Viterbi detector, and Defect detection. Other channel parameters can also be utilized.

Figure 6:
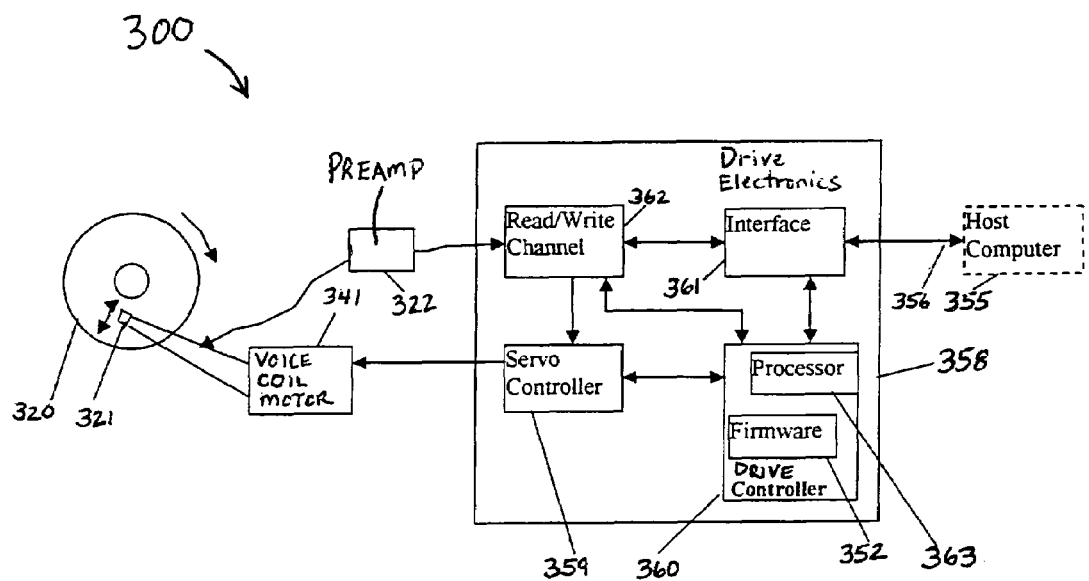
FIG. 6 shows an example block diagram of an embodiment of a disk drive according to the present invention.

FIG. 6 shows a block diagram of a data storage device such as an example disk drive 200 according to the present invention which implements the features of the present invention described herein. The disk drive 200 is shown connected to a computer system 225 via a bus 223. The disk drive 200 includes electronics 240 comprising a servo controller 215 typically concerned with servo control of the disk drive 200, a control unit or controller 217 for controlling components of the disk drive 200, a control processor 227 primarily for controlling data flow communications with the computer system 225 via an interface 219 and system bus 223, and a channel chip 221 for processing data being transferred between a data disk 11, the computer system 225, the servo controller 215 and the controller 217. A preamplifier 28 is for amplifying signals read by one or more transducers 26. Alternatively, the servo controller 215 can be a component of the controller 217. The disk drive 200 receives read and/or write requests from the host computer 225 and carries out the requests by performing data transfers between the disk drive 200 and the host 225.

The interface unit 219 is operative for providing an interface between the disk drive 200 and the host computer 225. During read and write operations, the interface unit 219 provides a communications path, including data buffering functions, between the host computer 225 and the read/write channel 221. In addition, the interface unit 219 is operative for receiving commands and requests from the host 225 and directing them to the controller 217. The controller 217 then carries out the commands by appropriately controlling the elements within the disk drive 200.

A VCM 69 is operative for controllably positioning the transducers 26 with respect to their corresponding disk surfaces in response to a control signal generated by the servo controller 215. The transducers are all coupled to an single integrated arm assembly and thus move together under the influence of the VCM 69. When performing a read or write operation, the controller 217 instructs the servo controller 215 to move one of the transducers 26 to a target track on a corresponding disk surface so that a data transfer can take place. The channel chip 221 receives an amplified signal from the preamplifier 28. The channel chip 221 is implemented based on the architecture for the channel 103 in FIG. 4 according to the present invention, described above.

Figure 7:
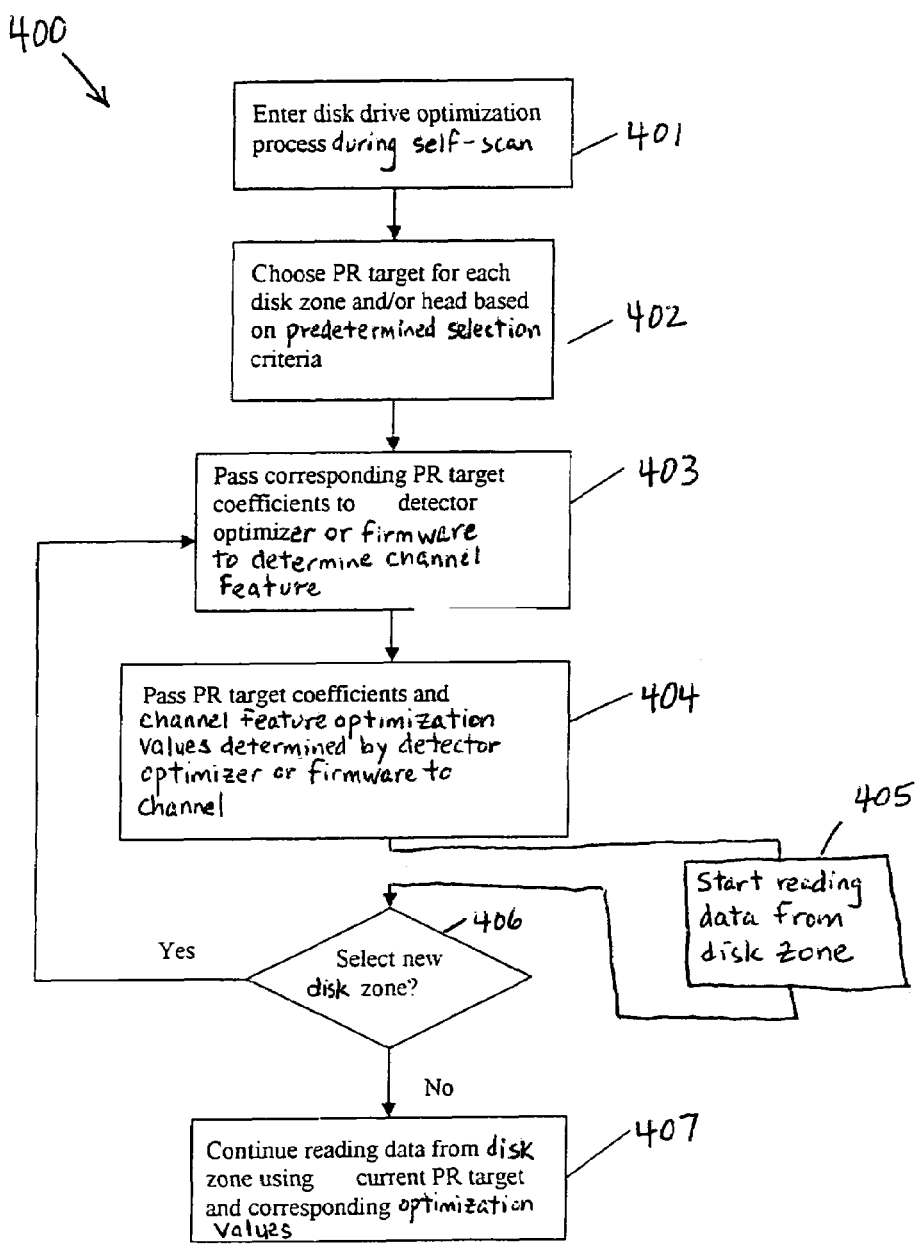
FIG. 7 shows an example flowchart of the steps of channel optimization according to the present invention.

FIG. 7 shows an example flow diagram of the steps of an embodiment of a channel performance optimization method according to the present invention for the channel 103 of FIG. 4 implemented in the channel chip 221 of the disk drive 200 in FIG. 6. In this example, the disk drive 200 enters an optimization process during e.g. disk drive selfscan in the factory (step 300). Then PR targets are selected by the selector 107 for one or more disk zones and/or heads based on desired BER, mean square error (MSE) or other criteria (step 302). In the description herein, the terms "PR targets" and "PR target coefficients" are used interchangeably. The PR target coefficients are provided to the detector optimization block DO block 110 (FIG. 4), or to a firmware block 111 in the disk drive controller 217 (FIG. 6). The DO block 110 or the firmware 111 determine proper (e.g., optimized) channel parameters/functions (e.g., ZPS, CS, STAM, error, slope, etc.) as described further below (step 304). The selected PR target coefficients and the optimization values determined by the DO block 110 or the firmware 111 are provided to the components of the channel chip 221 (e.g., the LOOPs 108, servo and data detectors 106, etc.), and thereafter reading from said disk zone(s) using the adapted channel begins (step 306). A determination is made if reading from the current disk zone continues (step 308). If so, reading continues from the current zone using the current PR target and corresponding parameters (step 310). Otherwise, the process proceeds to step 304 for the next zone. In this embodiment, the PR targets are selected, and said channel parameters are calculated as above, per zone and/or head during self-scan, and stored on disk in the disk drive. Then when reading from a zone with a head, the calculated values are loaded from disk to corresponding channel registers for data read/write.

Figure 8:
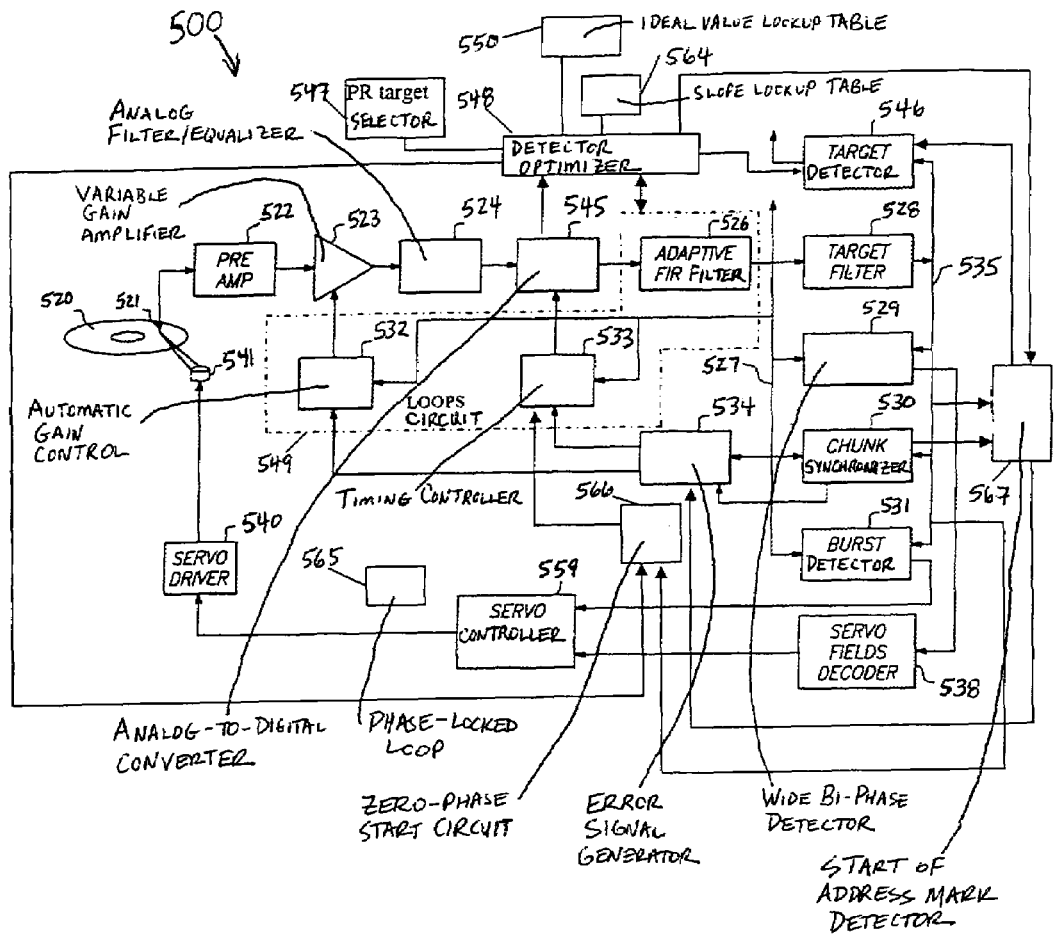
FIG. 8 shows a block diagram of another embodiment of an example disk drive according to the present invention.

FIG. 8 shows a block diagram of another embodiment of an example disk drive 200 according to the present invention, for implementing the PR target selection and channel optimization processes described herein. An embodiment of such optimization process according to the present invention is described for each of said channel parameters and algorithm/functions above, to implement flexible PR targets. Example PR targets can be: (1) NPR target, (2) a flexible target that produces a 3-level preamble signal and (3) an unconstrained flexible target, wherein:

| NPR target: | [7, 4, −4, −5, −2]; |
|---|---|
| A flexible 5-tap target: | [$p_0, p_1, p_2, p_3, p_4$]; |

As such, each state transition, i.e. each new read signal sample, results in an output (i.e., detector ideal value output d) described by the target polynomial:

$$p_0 + p_1 \times D + p_2 \times D^2 + p_3 \times D^3 + p_4 \times D^4$$

wherein $p_0$ through $p_4$ are coefficients or the PR targets, and can be any desired value (i.e., flexible target). Though in the embodiment described herein, $p_0$ through $p_4$ are used, the present invention is equally useful with other number of coefficients and can be easily applied by those skilled in the art.

A 3-level target is a subset of the unconditional flexible target approach according to the present invention. The 3-level target is mentioned herein as an example and provides a context for the description of example embodiments of the present invention described herein. As such, in addition to the implementations for the general approach of unconstrained flexible targets, implementations for the special 3-level targets are provided where appropriate.

Further, although a flexible 5-tap target is described herein by example, the present invention is useful with any multiple-tap target. Throughout this description an {±1} input alphabet is assumed. Thus, in the read channel, using a lookup table of the ideal values d's, IVLUT 105 in FIG. 4, there is implicit mapping between the {0,1} inputs to the IVLUT 105 and the {±1} input alphabet used to generate the IVLUT 105. If the PR target is DC-free (i.e., signal spectrum content at zero-frequency is zero), having a {±1} input alphabet is equivalent to having a {0,1} input alphabet and scaling the target by a factor of 2. If the target is not DC-free, having a {±1} input alphabet is equivalent to having a {0,1} input alphabet and scaling the target by a factor of 2, and also introducing a level shift such that the ideal values are centered around zero. In this case, for example, the negative preamble samples are the opposite of the corresponding positive preamble samples. If the target is not DC-free and if the IVLUT 105 is generated using a {0,1} input alphabet, then because the signal at the output of high-pass filters has no DC, the DC tap introduces DC to match the DC level shift in the IVLUT values, such that:

Preamble:  |+ + − −|+ + − −|+ + − −|
chunk phase:  0 1 2 3  0 1 2 3  0 1 2 3

Channel Output:
$$q_3 = -P_4 + P_3 + P_2 - P_1 - P_0$$
$$q_2 = -P_4 \ P_3 + P_2 + P_1 - P_0$$
$$q_1 = P_4 - P_3 - P_2 + P_1 + P_0$$
$$q_0 = P_4 + P_3 - P_2 - P_1 + P_0$$

where $q_i$ are the values $d_1$ when reading from the preamble. In the preamble "+" represents 1 and "−" represents 0, and the chunk_phase values (e.g., 0, 1, 2, 3) correspond to the preamble phases (++−−), as shown above. Further, $q_0 = -q_2$ and $q_1 = -q_3$ if linear superposition holds. If the target has a 3-level output during reading the preamble, then either $q_0 = 0$ or $q_1 = 0$. If the target has 2-level output during reading the preamble, then either $q_0 = q_1$ or $q_1 = q_2$. For example, in NPR, $q_1$ is the largest positive value and chunk_phase=0 corresponds to having the largest positive peak be the first sample of the four samples used for chunk sync. This is not necessarily the case for all flexible targets.

In the definitions of $q_1$ above, wherein $0 \leq i \leq 3$, for illustration purposes, it is assumed that linear superposition holds. In the example algorithms herein, the ideal values d's (and error values) are generated using said nonlinear ideal value lookup table IVLUT 105. As such, it may not always be the case that $q_0 = -q_2$ and $q_1 = -q_3$.

In one embodiment, the input to the IVLUT 105 is a binary sequence which has the length of the PR target. There can be at least two IVLUTs (programmable), one without the nonlinear adjustments to the ideal values (i.e., simply based on the linear response of the flexible target), and the other(s) using the nonlinear ideal values. The IVLUT values are used to generate error signals for the channel loops (by subtracting ADC sample s from the sample input data) and for various calculations relating to flexible targets (e.g., ZPS, chunk sync, start of address mark detection, slope lookup table generation, etc.).

As stated, in one embodiment, the present invention provides a method of automatically optimizing and programming the read channel parameters and algorithms for any PR target that is selected, based on the PR target coefficients, as described by example below.

Zero Phase Start (ZPS)

Typically, Zero-Phase Start (ZPS) is used to provide an initial phase estimate in both user data and servo preambles for timing recovery (in one example this can be accomplished by the Zero-Phase Restart (ZPR) approach described above). Because with any flexible target the preamble is sinusoidal, an adjustment can be made to the ZPS based on the phase of the noiseless preamble with the particular flexible target.

Below, $s_k$ represent the ADC samples at times k and the in one example ZPS is determined by a ZPS logic block 57 (FIG. 8) as follows:

For a 3-Level Target (or an NPR Target):

$$reg0 = s_k - s_{k+2} + s_{k+4} - \ldots + s_{k+N-4} - s_{k+N-2},$$

$$reg1 = s_{k+1} - s_{k+3} + s_{k+5} - \ldots + s_{k+N-3} - s_{k+N-1},$$

$$ZPS = atan(reg0/reg1);$$

wherein N is the width of the sample window used to estimate the ZPS

For an Unconstrained Flexible Target:

$$ZPS = atan(reg0/reg1) + \Theta;$$

wherein:

$$\Theta = 0 - atan(q_2/q_1),$$

and atan( ) is the arctangent( ) function used in Discrete Fourier Transform (DFT) calculations in the frequency domain.

Chunk Sync (CS)

Chunk sync (CS) processing is used to determine the alignment within the four phases of a preamble (e.g., 0011). In one example, the chunk sync is performed in effect by using four matched filters in the chunk sync block 59 (FIG. 8), one filter for each of the four phases based on $q_0$, $q_1$, $q_2$, $q_3$, respectively, for filtering the preamble with each of the four filters, and then choosing the phase corresponding to the filter with the largest output. For flexible targets, according to the present invention, the matched filters are modified to match the noiseless preamble with the particular flexible target, wherein:

For an unconstrained flexible target:

In general (e.g., using the ideal value lookup table IVLUT 105):

$$reg0 = q_0 s_k + q_1 s_{k+1} + q_2 s_{k+2} + q_3 s_{k+3} + q_0 s_{k+4} + q_1 s_{k+5} + \ldots + (q_{1 \bmod 4}) s_{k+i},$$

$$reg1 = q_1 s_k + q_2 s_{k+1} + q_3 s_{k+2} + q_0 s_{k+3} + q_1 s_{k+4} + q_2 s_{k+5} + \ldots + (q_{1 \bmod 4}) s_{k+i-1},$$

where:

If |reg0|<|reg1| and reg1>0, then chunk_phase=0;
If |reg0|>|reg0| and reg1<0, then chunk_phase=1;
If |reg0|<|reg1| and reg1<0, then chunk_phase=2;
If |reg0|>|reg0| and reg1>0, then chunk_phase=2;

wherein the chunk_phase corresponds to the phase of the most recent ADC sample, and 0<=i<=N−1, and N is the width of the sample window used to estimate the CS.

Assuming that linear superposition holds such that $q_0 = -q_2$ and $q_1 = -q_3$, and when e.g. N=4, then:

$$reg0 = q_0 s_k + q_1 s_{k+1} - q_0 s_{k+2} - q_1 s_{k+3},$$

$$reg1 = q_1 s_k - q_0 s_{k+1} - q_1 s_{k+2} + q_0 s_{k+3}.$$

The relations above require multiplications of the q and s values as shown. However, the algorithm can be simplified by approximating $q_1$ as:

$$q_1 \approx \hat{q}_i = 2^{mi} \pm 2^m, \ 0 \leq i \leq 3.$$

where mi, ni, and the sign of $2^m$ are selected to minimize $|\hat{q}_1 - q_1|$.

If it is required that the sign of 2n' be positive, the implementation may be simplified, but it may result in a performance loss in some cases due to coarser quantization. Multiplying each q and s value is then performed by binary shifting of the s value bits based on the approximated q value.

For NPR or a 3-Level Target:

wherein $q_0 = -q_2 = 0$, and $q_1 = -q_3$, such that when N=4:

$$reg0 = q_0 s_k + q_1 s_{k+1} + q_2 s_{k+2} + q_3 s_{k+3};$$

$$reg1 = q_1 s_k + q_2 s_{k+1} + q_3 s_{k+2} + q_0 s_{k+3};$$

or more simply:

$$reg0 = s_{k+1} - s_{k+3},$$

$$reg1 = s_k - s_{k+2};$$

and in general for any N:

$$reg0 = s_{k+1} - s_{k+3} + s_{k+5} - \ldots s_{k+N-3} - s_{k+N-1},$$

$$reg1 = s_k - s_{k+2} + s_{k+4} - \ldots + s_{k+N-4} - s_{k+N-2};$$

The rest of the algorithm is similar to the 3-level preamble case, where:

If |reg0|<|reg1| and reg1>0, then chunk_phase=0;
If |reg0|>|reg1| and reg0<0, then chunk_phase=1,
If |reg0|<|reg1| and reg1<0, then chunk_phase=2;
If |reg0|>|reg1| and reg0>0, then chunk_phase=3.

Detection of Start of Address Mark (STAM)

Detection of start of address mark (STAM) is used: (a) to indicate the end of the preamble (in data sector 120 and/or servo sector 122, FIG. 5), for switching from acquisition to tracking mode in a channel phase-lock loop (PLL) 47 (FIG. 8), (b) to provide an option for very short address marks, and/or (c) to provide a timing reference for synchronization of Viterbi trellis pruning before the full address mark detection is available. Detection of the start of address mark uses Euclidean-space detection based on distinguishing between the preamble and start of the address mark. Because the preamble samples and the start of address mark samples are functions of the flexible target, the detection algorithm is modified for the particular flexible target according to the present invention.

For example, where the received ADC samples are $\{s_0, s_1, s_2, s_3\}$, then the condition where transition form preamble to start of address mark is recognized ("bailout") is provided as follows using minimum Euclidean distance receiver implemented by a STAM_Detect logic block 71 (FIG. 8):

For a 3-Level Target and an Unconstrained Flexible Target:

| | Preamble | | | | STAM | | | |
|---|---|---|---|---|---|---|---|---|
| NRZ input: | + | + | − | − | − | − | + | + |
| Ideal ADC output: | $q_0$ | $q_1$ | $q_2$ | $q_3$ | $r_0$ | $r_1$ | $r_2$ | $r_3$ |

If $$\sum_{i=0}^{3}(s_i - r_i)^2 \le \sum_{i=0}^{3}(s_i - q_i)^2,$$

or $$\sum_{i=0}^{3}(q_i - r_i)s_i \le \sum_{i=0}^{3}(q_i^2 - r_i^2)/2$$

then bail out.

In this example the preamble comprises 1100 and the first 4 bits of address mark are 0011. The above applies to different values and lengths for any selected preamble and start address mark. In this example the length is 4 and as such samples $\{s_0, s_1, s_2, s_3\}$ are used. The $r_1$ values are the values $d_i$ when reading from the STAM.

If linear superposition holds, then $$q_0 = p_4 + p_3 - p_2 - p_1 + p_0;$$

$$q_1 = p_4 - p_3 - p_2 + p_1 + p_0;$$

$$q_2 = -p_4 - p_3 + p_2 + p_1 - p_0;$$

$$q_3 = -p_4 + p_3 + p_2 - p_1 - p_0;$$

$$r_0 = p_4 + p_3 - p_2 - p_1 - p_0;$$

$$r_1 = p_4 - p_3 - p_2 - p_1 - p_0;$$

$$r_2 = -p_4 - p_3 - p_2 - p_1 + p_0;$$

$$r_3 = -p_4 - p_3 - p_2 + p_1 + p_0;$$

Such that the above bailout condition can be rewritten as:
If $$p_0 s_0 + (p_0 + p_1)s_1 + (-p_0 + p_1 + p_2)s_2 + (-p_0 - p_1 + p_2 + p_3)s_3 \le -p_o(p_1 + 2p_2 - p_3 - 4p_4) - p_1(p_2 + 2p_3 - p_4) - p_2(p_3 + 2p_4) - p_3 p_4$$

then bail out, or

If $$c_0 s_0 + c_1 s_1 + c_2 s_2 + c_3 s_3 \le T$$

then bail out.

In the more general case, the ideal value lookup table IVLUT 105 can be used to obtain $q_1$ and $r_1$, where:

$$c_i = q_1 - r_1, 0 \le i \le 3$$

and $$T = \sum_{i=0}^{3}(q_i^2 - r_i^2)/2.$$

The ideal STAM detection algorithm with no ADC offset is:

If $$\sum_{i=0}^{3} c_i s_i \le T = \sum_{i=0}^{3}(q_i^2 - r_i^2)/2$$

then bail out, where $c_i = q_i - r_i$, $0 \le i \le 3$, and $q_1$ and $r_1$ are obtained using the ideal value lookup table IVLUT 105.

However, as with the chunk sync process, the above implementation can be simplified by approximating:

$$c_1 \hat{c}_i = \pm(2^{m1} \pm 2^m), \text{ for } 0 \le i \le 3,$$

where mi, ni, and the sign of $2^m$ are selected to minimize $|\hat{c}_i - c_i|$. Requiring that the sign of $2^m$ to be the same as the sign of $2^{m1}$ may simplify the implementation, but may result in a performance loss in some cases due to coarser quantization.

For the NPR target [7, 4, −4, −5, −2], the comparison equation becomes:

If $$7s_0 + 11s_1 - 7s_2 - 20s_3 \le -61,$$

or if $20s_3 - 11s_1 > 61 + 7s_0 - 7s_2$
then bail out.

Error Generation

An Error logic block 58 (FIG. 8) generates an error signal $error_k$, as a function of the selected flexible target, to update adaptive channel functions such as e.g. the phase-lock loop, gain control (AGC), FIR equalizer, MR asymmetry cancellation, and for other purposes. As such the error signal allows adapting various channel functions to improve channel performance (e.g., increase SNR, decrease BER, etc.). The error signal is obtained by subtracting from the ADC sample s the noiseless ideal value d, wherein the noiseless ideal value d is a function of the data pattern and the particular flexible target, according to the following relations:

For NPR Target, a 3-Level Target, or an Unconstrained Flexible Target:

For ADC samples $s_k$ at time k, the error signal $error_k$ is represented as:

$$error_k = s_k - d_k$$

or $$error_k = s_k - IVLUT_k$$

where IVLUT is the ideal value lookup table 105 containing the ideal values $d_k$, which is a function of the flexible PR target. Given the PR target (e.g., $p_0$ through $p_4$) and a 5-bit sample pattern $s_k$ (e.g., $a_0$ through $a_4$) at time k, the IVLUT provides the corresponding, previously calculated and stored, ideal value:

$$d = p_0 \times a_0 + p_1 \times a_1 + p_2 \times a_2 + p_3 \times a_3 + p_4 \times a_4.$$

Preferably, the ideal value is adjusted to account for signal non-linearities. Further, the linear or non-linear error signal can be used to adapt the channel functions.

Slope Lookup Table (SLT)

The highest frequency in the read signal spectrum corresponds to the fastest changing slope of the signal (a narrow pulse will have a wider spectrum than a wide, slowly changing pulse). A slope lookup table (SLT) 75 is used, along with said error signal $error_k$, to obtain a timing gradient to update the phase-lock loop (PLL) that performs phase detection when reading the user data pattern. The noiseless slope estimate is a function of the data pattern and the particular flexible target.

The phase-lock loop update uses a timing gradient $phdet_k$ provided by the product of $SLT_k$ and the error signal $error_k$, performed by the DO block 110, as:

$$phdet_k = SLT_k \cdot error_k = SLT_k \cdot (s_k - IVLUT_k),$$

wherein the slope $SLT_k$ can be quantized to 0 and +/−1 for simplicity and faster PLL adaptation, and is a function of the PR target, as described below.

For NPR Target, a 3-Level Target, or an Unconstrained Flexible Target:

For a flexible target, it is desirable to populate the slope lookup table 75 in real-time e.g. by using the ideal value lookup table. A good approximation to the slope value at time k can be provided by the difference between the two ADC samples at times k+1 and k−1, wherein the slope $g_k$ can be approximated as:

$$g_k = s_{k+1} - s_{k-1};$$

wherein $g_k$ can be estimated using more samples (s's)

If linear superposition holds, the noiseless ADC sample values s can be represented as:

$$s_{k+1} = b_{k+1} \cdot p_0 + b_k \cdot p_1 + b_{k-1} \cdot p_2 + b_{k-2} \cdot p_3 + b_{k-3} \cdot p_4,$$

and $$s_{k-1} = b_{k-1} \cdot p_0 + b_{k-2} \cdot p_1 + b_{k-3} \cdot p_2 + b_{k-4} \cdot p_3 + b_{k-5} \cdot p_4,$$

where $b_{k+1}, b_k, b_{k-1}, b_{k-2}, b_{k-3}, b_{k-4}, b_{k-5}$ are preliminary decisions (e.g., earlier or less accurate Viterbi decisions, or decision from low latency detectors). In the more general case, the values of $s_{k+1}$ and $S_{k-1}$ are obtained using the ideal value lookup table, wherein: (1) the set $b_{k+1}, b_k, b_{k-1}, b_{k-2}, b_{k-3}$ is used to look up $s_{k+1}$ and (2) the set $b_{k-1}, b_{k-2}, b_{k-3}, b_{k-4}, b_{k-5}$ is used to look up $s_{k-1}$. Therefore, the slope $g_k$ can be determined by using the ideal value lookup table 105.

If $g_k$ is determined in this way, it is a function of the 7 bits: $b_{k+1}, b_k, b_{k-1}, b_{k-2}, b_{k-3}, b_{k-4}, b_{k-5}$. For simplicity, in an example 6-bit slope lookup table, $b_{k-5}$ is outside the time window considered for the binary input sequence, and is assumed to have the average value which is zero for $\{+/-1\}$ binary sequence, i.e., the slope value is obtained by averaging the slope for $b_{k-5}=+1$ with the slope for $b_{k-5}=-1$.

To quantize the slope lookup table, the maximum absolute slope value is needed. Given the target polynomial $\{p_0, p_1, p_2, p_3, p_4\}$, the slope $g_k$ can be provided by:

$$\begin{aligned} g_k &= s_{k+1} - s_{k-1} \\ &= (p_0 b_{k+1} + p_1 b_k + p_2 b_{k-1} + p_3 b_{k-2} + p_4 b_{k-3}) - \\ &\quad (p_0 b_{k-1} + p_1 b_{k-2} + p_2 b_{k-3} + p_3 b_{k-4} + p_4 b_{k-5}) \\ &= p_0 b_{k+1} + p_1 b_k + (p_2 - p_0) b_{k-1} + (p_3 - p_1) b_{k-2} + \\ &\quad (p_4 - p_2) b_{k-3} - p_3 b_{k-4} - p_4 b_{k-5} \end{aligned}$$

Therefore, the maximum amplitude ($g_{max}$) of the slope values is provided by:

$$g_{max} = |p_0| + |p_1| + |p_2 - p_0| + |p_3 - p_1| + |p_4 - p_2| + |p_3| + |p_4|.$$

The slope lookup table 75 can be quantized as:

$$SLT_k = \begin{cases} +1 & \text{if } g_k > g_{max}/v; \\ 0, & \text{if } |g_k| \le g_{max}/v; \\ -1, & \text{if } g_k < -g_{max}/v. \end{cases}$$

wherein an example reasonable choice for the threshold value 1/v is ¼ of the maximum slope value. Other values for v that increase channel performance can also be used.

The gain of a phase detector of the timing loop in the LOOPs block 108 may change when the PR target is changed. Thus, the phase gain should be normalized to maintain the same overall loop gain. However, if the PR targets are scaled so that the signal amplitude is approximately the same as with NPR, the difference between targets should be small enough to neglect.

Preamble Timing Gradient

A Data timing gradient is used to obtain timing estimates during reading preamble data. The Data timing gradient is determined in the DO block 110 as the product of slope estimate and the error signal. Both the noiseless ideal value (which is used to obtain the error signal) and the slope estimate are a function of the estimated data pattern and the particular flexible target.

In addition, a Preamble timing gradient is used to obtain timing estimates during the preamble. As with the data timing gradient, both the noiseless ideal values and the slope are a function of the particular flexible target. However, for preamble timing gradient, the ideal values and slope can be calculated and programmed in advance for a given flexible target since the preamble pattern is known.

For NPR or a 3-Level Target:

The timing gradient $phdet_k$ is:

$$phdet_k = (-1)^{k/2} s_k$$

wherein k is even. As mentioned above, the phase detector gain should be adjusted for different targets, but if the PR targets are scaled so that the preamble amplitude is approximately the same as the NPR preamble amplitude, the difference should be small enough to neglect.

For an Unconstrained Flexible Target:

The most general preamble output with a flexible target is of the form: $\{q_0 q_1 q_2 q_3 \ldots\}$, wherein the timing gradient $phdet_k$ (e.g., optimal timing gradient) is the product of the slope $SL_k$ and the error signal $error_k$, as:

$$phdet_k = SL_k \cdot error_k = SL_k \cdot (s_k - I_k);$$

where $I_k$ is $\{q_0 q_1 q_2 q_3 \ldots\}$, and $SL_k$ is the slope of ideal sinusoidal preamble at time k. The slope $SL_k$ can be quantized to 0 and +/−1 using a threshold which is ¼ of the maximum slope. The maximum slope occurs at the zero crossing and is proportional to the peak amplitude of the preamble pattern. The timing gradient can be computed with a single lookup table which has two inputs: (1) the ADC output $s_k$ and (2) the time index k mod 4. If a single lookup table is used, it can save one clock cycle of latency.

The simplest approach is to use the same slope lookup table 75 for preamble timing recovery as for data timing (i.e., replace $SL_k$ with $SLT_k$). This approach differs from the SLT approach above, in that the term $b_{k-5}$ is assumed to be unknown with the slope lookup table $SLT_k$. However, because the data pattern is the preamble, the term $b_{k-5}$ is known and this knowledge is used in the slope lookup table SLT 75. And, because the slope lookup table 75 can be heavily quantized, the difference should be minimal.

Viterbi Detector and Defect Detection

The Viterbi detector 106 is used to detect the binary data pattern from the noisy ADC samples. Branch metrics are used in the Viterbi detector to calculate the Euclidean distance between the ADC sample s and the estimated noiseless ideal value d, which is a function of the particular flexible target. An implementation is to pre-calculate and store all of the branch metrics in a branch metric lookup table (BMLUT) 109 (FIG. 4). According to the present invention, the precalculation depends on the particular flexible target, such that the branch metric lookup table is programmable based on the selected flexible target (not hard-wired). Defect detection can be used to detect media defects that cause e.g. thermal asperities (TA) in the factory during self-scan. A periodic pattern such as the preamble is written to the disk, and filters (e.g., moving average filters) of various lengths which are matched to the noiseless output are used to detect the defects. The noiseless output is a function of the particular flexible target, so the filters are a function of the particular flexible target. A particular target is selected by the PR target selector 107 (FIG. 8) for detecting TA defects, wherein the filter frequency response shape is essentially matched to the defect signal. This improves the chances of detecting defects by using a PR target that matches the shape of the particular defect (e.g., TA) The PR target need not be the same as the target used in the main detector (i.e., Viterbi)

Other Parameters Adapted Based on Flexible Targets

According to another aspect of the present invention, the ranges for tap weight of the FIR 48 (FIG. 8) is a function of the flexible targets, both with longitudinal and perpendicular recording. Preferably, adaptation of the FIR 48, the PLL 47, the MRAC and the AGC 54 do not have any significant interactions for any PR targets to prevent instability in the channel. The target amplitude should be small enough so that the number of ADC levels are sufficient to provide adequate headroom in the event of baseline shift due to thermal asperities (TA), etc., and large enough so that the ADC resolution is sufficient. An example ADC value can be 27, and with NPR, the maximum ideal value is 22 (flexible PR targets should have maximum ideal values close to 22 for 6-bit ADC value).

As such, the present invention provides automatic hardware and firmware optimization for any PR target that is selected. There are several advantages for automatic hardware optimization, because: (1) there are many parameters and algorithms that must be set properly when a different PR target is selected; (2) given a PR target, the optimization of the associated parameters and algorithms is obtained automatically as described above; and, (3) if the optimization process is contained in the read channel hardware, it can be designed and debugged once, as opposed to many times if it is contained in the firmware 111 in the disk drive controller 217. The firmware 111 can comprise program instructions for execution by the processor 227 in the drive controller 217, which implements the steps of the method of the present invention.

The present invention has been described in considerable detail with reference to certain preferred versions thereof; however, other versions are possible. Therefore, the spirit and scope of the appended claims should not be limited to the description of the preferred versions contained herein.

What is claimed is:

1. In a magnetic recording and playback system that includes a data channel, a head and a recording media, wherein the channel includes a data detector that detects a series of digital samples, the digital samples are a function of a partial response (PR) target and data stored on the media, and the head reads from and writes to the media, a method of improving the channel performance, comprising:
   selecting, dynamically by PR target selector circuitry, at least one flexible PR target from multiple PR targets having arbitrary coefficients, the flexible PR target selected based on one or more selection criteria, wherein the detector uses the selected flexible PR target to detect data stored on the media; and
   adjusting, dynamically by detector optimizer circuitry, at least one channel feature based on the selected flexible PR target;
   wherein the channel is not hard-coded for the PR targets, and the channel is not hard-coded for the channel feature.

2. The method of claim 1, wherein the channel feature is a function of the selected PR target.

3. The method of claim 1, wherein the channel feature is a channel parameter, a channel function or a channel algorithm.

4. The method of claim 1, wherein the method is performed during self-scan.

5. The method of claim 1, wherein the method is performed during user operation.

6. The method of claim 1, wherein the selection criteria is a location of data on the media.

7. The method of claim 6, wherein the location is a radial zone on the media.

8. The method of claim 1, wherein the selection criteria is based on the head and the media.

9. The method of claim 1, wherein the selection criteria is a signal-to-noise ratio (SNR) of a read signal generated by the head in response to reading from the media.

10. The method of claim 1, wherein the selection criteria is a bit error rate (BER) of the detector.

11. The method of claim 1, wherein the selection criteria is a mean squared error (MSE) input to the detector.

12. The method of claim 1, wherein the selection criteria is a recording format of the media.

13. The method of claim 12, wherein the recording format is longitudinal recording or perpendicular recording.

14. The method of claim 13, wherein the channel supports longitudinal recording and perpendicular recording.

15. The method of claim 1, wherein the channel feature is a zero-phase start (ZPS).

16. The method of claim 1, wherein the channel feature is a chunk synchronization (CS).

17. The method of claim 1, wherein the channel feature is a start of address mark (STAM) detection.

18. The method of claim 1, wherein the channel feature is an error signal to update a channel function.

19. The method of claim 18, wherein the channel function is an adaptive finite impulse response filter, an automatic gain control, a phase-locked loop or a magneto-resistive asymmetry cancellation.

20. The method of claim 18, wherein adjusting the error signal includes subtracting the digital samples from detector ideal values, and the ideal values are functions of the selected PR target.

21. The method of claim 1, wherein the channel feature is a slope lookup table (SLT).

22. The method of claim 21 wherein a slope for the SLT is determined using multiple digital samples.

23. The method of claim 21, further comprising, quantizing a slope to 0 and +/−1 as a function of the selected PR target.

24. The method of claim 1, wherein the channel feature is a preamble timing gradient.

25. The method of claim 1, wherein the channel feature is a Viterbi detector.

26. The method of claim 1, wherein the channel feature is a media defect detector.

27. The method of claim 1, wherein the channel feature is an adaptive finite impulse response filter.

28. The method of claim 1, wherein the channel feature is an automatic gain control.

29. The method of claim 1, wherein the channel feature is a phase-locked loop.

30. The method of claim 1, wherein the channel feature is a magneto-resistive asymmetry cancellation.

31. A disk drive, comprising:
a disk;
a head that reads from and writes to the disk;
a data channel that includes a data detector that detects a series of digital samples based on (1) a read signal generated by the head in response to data stored on the disk, and (2) a partial response (PR) target based on the read signal and;
PR target selector circuitry adapted to dynamically select at least one flexible PR target from multiple PR targets having arbitrary coefficients, the flexible PR target selected based on one or more selection criteria, wherein the detector uses the selected flexible PR target to detect data stored on the media; and
detector optimizer circuitry adapted to dynamically adjust at least one channel feature based on the selected flexible PR target;
wherein the channel is not hard-coded for the PR targets, and the channel is not hard-coded for the channel feature.

32. The disk drive of claim 31, wherein the selection criteria is a radial zone on the disk.

33. The disk drive of claim 31, wherein the selection criteria is based on the head and the disk.

34. The disk drive of claim 31, wherein the selection criteria is a signal-to-noise ratio (SNR) of the read signal.

35. The disk drive of claim 31, wherein the selection criteria is a bit error rate (BER) of the detector.

36. The disk drive of claim 31, wherein the selection criteria is a mean squared error (MSE) input to the detector.

37. The disk drive of claim 31, wherein the selection criteria is a recording format of the disk.

38. The disk drive of claim 37, wherein the recording format is longitudinal recording or perpendicular recording.

39. The disk drive of claim 38, wherein the channel supports longitudinal recording and perpendicular recording.

40. The disk drive of claim 31, wherein the channel feature is a zero-phase start (ZPS).

41. The disk drive of claim 31, wherein the channel feature is a chunk synchronization (CS).

42. The disk drive of claim 31, wherein the channel feature is a start of address mark (STAM) detection.

43. The disk drive of claim 31, wherein the channel feature is an error signal to update a channel function.

44. The disk drive of claim 31, wherein the channel feature is a slope lookup table (SLT).

45. The disk drive of claim 31, wherein the channel feature is a pre-amble timing gradient.

46. The disk drive of claim 31, wherein the channel feature is a Viterbi detector.

47. The disk drive of claim 31, wherein the channel feature is a media defect detector.

48. The disk drive of claim 31, wherein the channel feature is an adaptive finite impulse response filter.

49. The disk drive of claim 31, wherein the channel feature is an automatic gain control.

50. The disk drive of claim 31, wherein the channel feature is a phase-locked loop.

51. The disk drive of claim 31, wherein the channel feature is a magneto-resistive asymmetry cancellation.

52. The disk drive of claim 31, wherein the channel feature is adjusted for longitudinal recording if the disk format is longitudinal recording, the channel feature is adjusted for perpendicular recording if the disk format is perpendicular recording, and the channel supports longitudinal recording and perpendicular recording.

53. A method, comprising:
dynamically determining one or more selection criteria in response to one or more properties of a magnetic recording and playback system;
dynamically selecting at least first and second flexible partial response (PR) targets, each target having arbitrary coefficients based on the selection criteria; and
dynamically adjusting one or more channel features of the magnetic recording and play-back system based on the selected flexible PR targets.

54. The method as in claim 53, further comprising:
detecting data stored on media of the magnetic recording and playback system according to the selected flexible PR target and adjusted channel features.

55. The method as in claim 53, wherein the selection criteria is a location on media of the magnetic recording and playback system.

56. The method as in claim 55, wherein the location is a radial zone onadisk.

57. The method as in claim 55, further comprising:
accessing a particular location on the media, wherein the flexible PR targets are dynamically selected based on the particular location, and the channel features are dynamically adjusted based on the selected flexible PR targets for the particular location; and
detecting data stored on media of the magnetic recording and playback system according to the selected flexible PR target and adjusted channel features for the particular location.

58. The method as in claim 53, wherein the selection criteria is a combination of a head and a media of the magnetic recording and playback system.

59. The method as in claim 53, wherein the selection criteria is a signal-to-noise ratio (SNR) of a read signal from a head of the magnetic recording and playback system in response to reading from media of the magnetic recording and playback system by the head.

60. The method as in claim 53, wherein the selection criteria is a bit error rate (BER) of a target detector of the magnetic recording and playback system.

61. The method as in claim 53, wherein the selection criteria is a mean-squared error (MSE) input to a target detector of the magnetic recording and playback system.

62. The method as in claim 53, wherein the selection criteria is a recording format of media of the magnetic recording and playback system.

63. The method as in claim 62, wherein the recording format of the media is selected from the group consisting of: longitudinal recording; perpendicular recording; and longitudinal and perpendicular recording.

64. The method as in claim 53, further comprising:
dynamically determining that a first portion of the media has a first selection criteria;
dynamically determining that a second portion of the media has a second selection criteria;
dynamically selecting the first flexible PR target for the first portion based on the first selection criteria;
dynamically selecting the second flexible PR target for the second portion based on the second selection criteria;
dynamically adjusting one or more channel features for the first portion based on the first selected flexible PR target; and
dynamically adjusting one or more channel features for the second portion based on the second selected flexible PR target.

65. The method as in claim 64, further comprising:
detecting data stored on the first portion according to the first selected flexible PR target and first adjusted channel features; and
detecting data stored on the second portion according to the second selected flexible PR target and second adjusted channel features.

66. The method as in claim 53, wherein the channel feature is a zero-phase start (ZPS).

67. The method as in claim 53, wherein the channel feature is a chunk synchronization (CS).

68. The method as in claim 53, wherein the channel feature is a start of address mark (STAM) detection.

69. The method as in claim 53, wherein the channel feature is an error signal to update a channel function.

70. The method as in claim 53, wherein the channel feature is a slope lookup table (SLT).

71. The method as in claim 53, wherein the channel feature is a pre-amble timing gradient.

72. The method as in claim 53, wherein the channel feature is a Viterbi detector.

73. The method as in claim 53, wherein the channel feature is a media defect detector.

74. The method as in claim 53, wherein the channel feature is an adaptive finite impulse response filter.

75. The method as in claim 53, wherein the channel feature is an automatic gain control.

76. The method as in claim 53, wherein the channel feature is a phase-locked loop.

77. The method as in claim 53, wherein the channel feature is a magneto-resistive asymmetry cancellation.

78. The method of claim 53, wherein the magnetic recording and playback system is not hard-coded for the flexible PR targets and the one or more channel features.

* * * * *

UNITED STATES PATENT AND TRADEMARK OFFICE
CERTIFICATE OF CORRECTION

PATENT NO. : 7,440,208 B1 Page 1 of 1
APPLICATION NO. : 10/251362
DATED : October 21, 2008
INVENTOR(S) : Peter McEwen et al.

It is certified that error appears in the above-identified patent and that said Letters Patent is hereby corrected as shown below:

Column 22:
Line 36, delete "onadisk" substitute --on a disk--

Signed and Sealed this

Sixteenth Day of December, 2008

JON W. DUDAS
*Director of the United States Patent and Trademark Office*